Oct. 7, 1952     K. L. TATE ET AL     2,612,908
DIFFERENTIAL PRESSURE SENSING UNIT

Filed Nov. 15, 1951     2 SHEETS—SHEET 1

INVENTOR.
KENNETH L. TATE
AND FLOYD B. NEWELL
BY
D. Clyde Jones
ATTORNEY

INVENTOR.
KENNETH L. TATE
AND FLOYD B. NEWELL
BY
D. Clyde Jones
ATTORNEY

Patented Oct. 7, 1952

2,612,908

UNITED STATES PATENT OFFICE 2,612,908

DIFFERENTIAL PRESSURE SENSING UNIT

Kenneth L. Tate and Floyd B. Newell, Rochester, N. Y., assignors to Taylor Instrument Companies, Rochester, N. Y., a corporation of New York Application November 15, 1951, Serial No. 256,554

4 Claims. (Cl. 137—780)

This invention relates to a differential pressure sensing unit suitable for use in a flow meter or in a differential pressure indicator, transmitter, or controller.

In prior sensing units of this type, there has been a considerable loss of energy in transmitting through the thick wall of a unit, to a device to be actuated thereby, the differential pressure sensed by the unit.

The present invention has for its purpose, a marked increase in the efficiency of such sensing units.

The various features and advantages of the invention will appear from the detailed description and claims when taken with the drawings in which:

Figure 1:
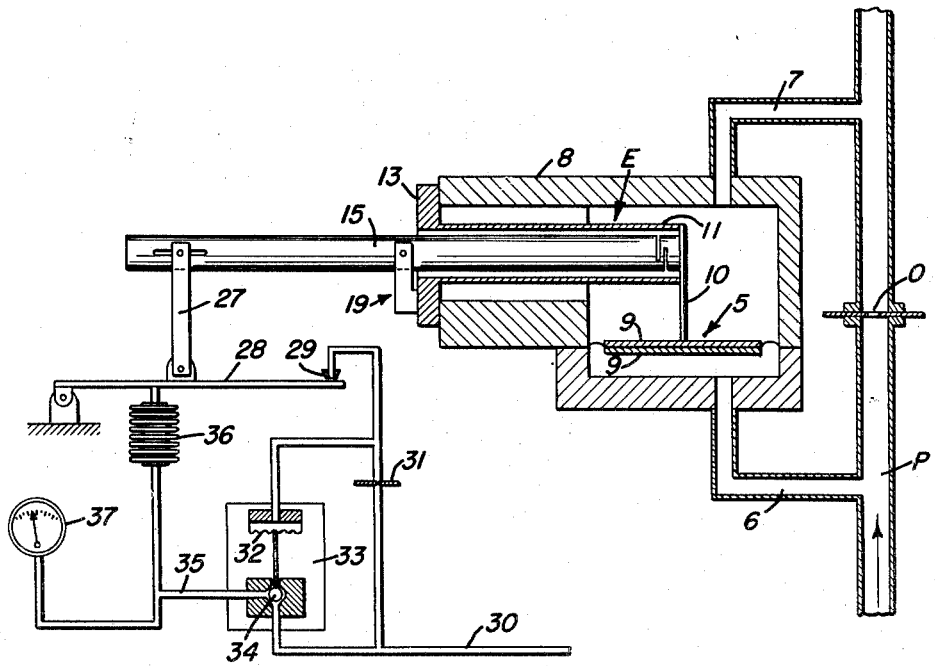
Fig. 1 is a diagrammatic showing of a differential pressure sensing unit of this invention incorporated in a system for indicating differential pressures.

For example, the present instrument may be used to measure the rate of flow of a fluid through a pipe P having an orifice plate O therein, as diagrammatically illustrated in Fig. 1. The drop in pressure of the fluid passing through the orifice plate, is sensed by an encased diaphragm 5 to the lower surface of which there is applied through the branch pipe 6, the high pressure of the fluid at the lower side of the orifice plate. The reduced pressure at the upper side of the orifice plate is communicated through the branch pipe 7 to the upper surface of the diaphragm. This diaphragm which is preferably circular, is clamped at its margin between the two parts of a hollow casing 8 having relatively thick walls, the diaphragm serving to divide the casing into two chambers.

In pressure sensing units of this type, it has been difficult to communicate the movement of the diaphragm as well as the resultant of the forces applied to the diaphragm, through the thick walls of the casing, without serious reduction of these forces. In accordance with the present invention, the diaphragm pads 9 which clamp the center portion of the diaphragm 5 therebetween leaving an unreinforced annular portion of the diaphragm, have one end of a flexible wire or strip 10 secured thereto. The other end of this wire is fastened to one end of the bending element, generally designated E, which projects in sealed relation through a side opening in wall of the upper part of the casing, into the upper chamber thereof. Specifically the bending element comprises a metal tube 11 which has its left end welded at 12 (Fig. 3), in the opening of an annular mounting plate 13 secured to the casing while its right end is welded at 14 to the right end of a metal rod 15 enclosed, with clearance, in the tube. This rod adjacent its right end is provided with two parallel transverse kerfs 16 and 17, extending in the same direction as the wire 10, from opposite sides of the rod and in overlapping relation with each other to provide a hinge 18 on which the left portion of the rod can be deflected with respect to the tube. The rod 15 at an intermediate part thereof is supported on a fulcrum 19 on which the rod can rock.

Figure 2:
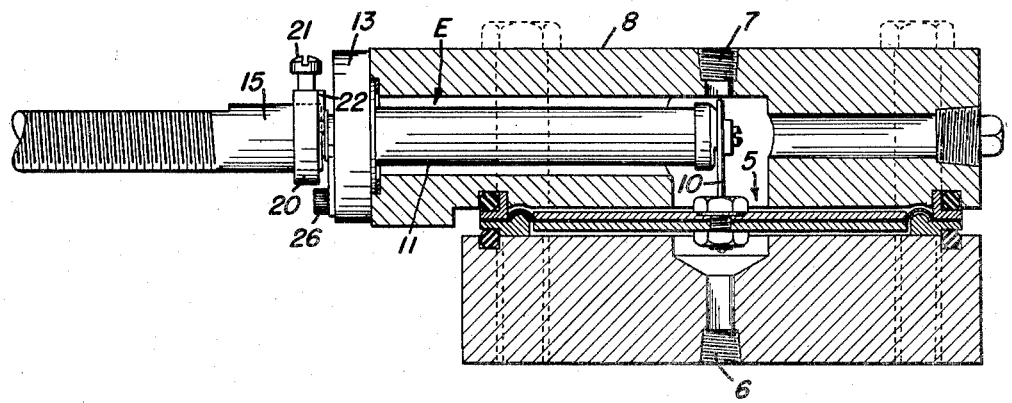
Fig. 2 is a vertical section taken through a portion of the differential sensing unit.
Figure 6:
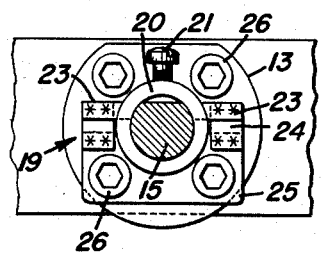
Fig. 6 is a fragmentary view showing how the rod of the bending element is mounted on a fulcrum attached to the casing of the unit.
Figure 7:
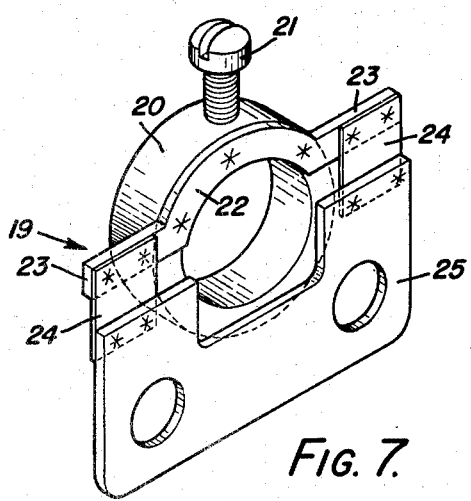
Fig. 7 is a perspective view illustrating the construction of the fulcrum.

Specifically the fulcrum 19, as shown in Figs. 6 and 7, comprises a ring 20 to receive the rod 15, the ring 20 being locked to the rod by a set screw 21. This ring has welded to a side thereof, an arcuate bar 22 having projecting arms 23, 23. These arms have leaf springs 24 welded thereto to project downward where their lower ends are welded to a mounting plate 25. This plate is bolted to the annular mounting plate 13 (Figs. 2 and 6) by certain of the bolts 26 which fasten the mounting plate to the casing.

The rod 15 projects outward from the casing where its left end is connected by a link 27 to an intermediate point on a baffle lever 28. The left end of this lever is pivoted on a fixed support while its right end cooperates with a nozzle 29 to vary the escape of pressure fluid through the nozzle, as the baffle lever is moved relative thereto by the link, in response to the movement of the rod 15. Pressure fluid is supplied through a pipe 30 and an orifice 31 of smaller diameter than the opening in the nozzle. By this arrangement as the baffle approaches the nozzle, the resultant varying back pressure in the nozzle is communicated to the capsular chamber 32 of a well-known relay valve 33. When the back pressure increases, the capsular chamber 32 tends to expand to move the ball 34 of the relay valve downward, thereby reducing the flow of air through the relay valve from the pipe 30 and also permitting some of the air in the connections at the left of the relay valve to escape to the atmosphere. When, however, the baffle moves away from the nozzle, the back pressure in the nozzle will be reduced and the capsular chamber of the relay valve will tend to contract, thereby tending to cause the ball of the relay valve to open for the passage of pressure fluid from the pipe 30 and tending to prevent exhausting of the relay valve to the atmosphere. The output pressure of relay valve is communicated through the conduit 35 to a bellows 36 which applies a force to the underside of the baffle lever until the force applied to the underside of this lever is equal to the force applied thereto through the link 27 at the upper side of this lever. The conduit 35 also communicates the pressure therein to a pressure gauge 37 or to a suitable receiver or controller which may be similar in construction to that illustrated in the patent to Tate et al. No. 2,361,885 granted October 31, 1944.

Figure 3:
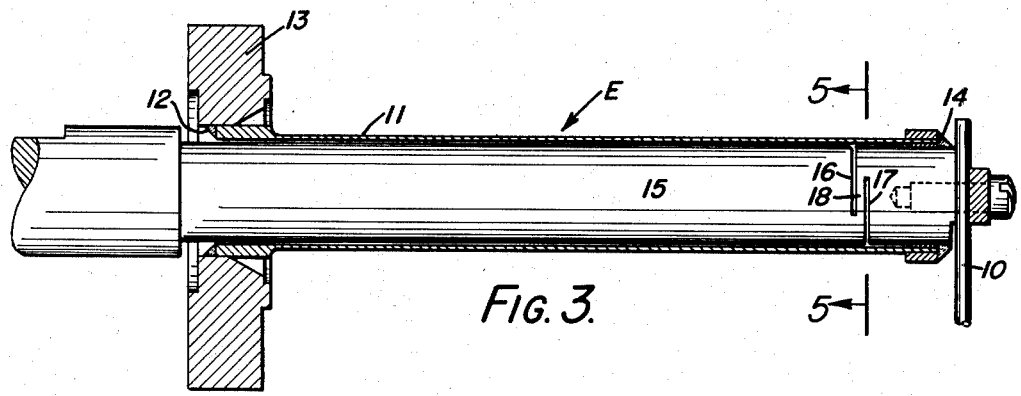
Fig. 3 is a vertical section through the bending element of Fig. 2.
Figure 5:
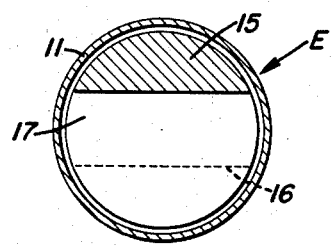
Fig. 5 is a section taken on the line 5—5 of Fig. 3 particularly showing how the right end of the rod is kerfed to provide a hinge about which the rod can be deflected relative to the enclosing tube of the bending element.
Figure 4:
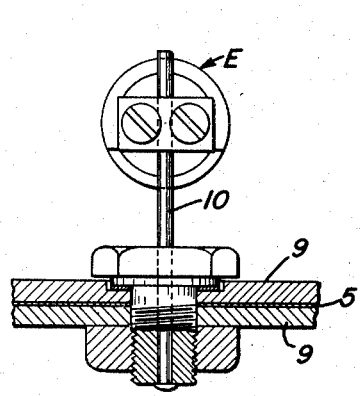
Fig. 4 is a vertical section through the diaphragm assembly and also showing how this assembly is coupled to the right end of the bending element.

In the operation of the unit, the differential pressure to be measured, acting on the diaphragm produces a force which is transmitted to the right end of the bending element E. This force is transmitted by means of the flexible strip or wire 10 to permit the end of the rod 15 to move in an arc while the center of the diaphragm 5 moves in a straight line. The right end of the rod 15 is supported by a concentric tube to seal off the fluid acting on the upper side of the diaphragm 5, from the outside atmosphere. The tube is made thin so that it will flex as the rod is tilted by the diaphragm, yet its thickness is made sufficient to withstand the high pressures surrounding it. The rod and the tube are connected together by an air tight joint at 14 (Fig. 3). Since the right end of the rod, if it were free, would move in an arc which is not the same as that followed by the corresponding end of the tube, some stretching of one or the other or both, would occur if they were attached rigidly together and moved. To overcome this condition, which would, in effect, add to the stiffness of the system, the rod is given a little flexibility at the point of attachment to the tube, by a pair of slots 16 and 17 (Fig. 3) as shown. This acts like a stiff fulcrum strip or bearing 18 and relieves the restraint. At the center of the rod, there is a bearing or fulcrum 19 which allows the rod to tilt in a vertical plane, about a fixed point and still not move laterally as the forces are applied. In this case flexible strips 24 are used. At the left end of the rod 15 is attached a baffle and a feed-back bellows. The baffle controls the nozzle pressure which is amplified by a reverse acting relay 33. The amplified pressure is fed to the feed-back bellows 36 to balance the forces on the lever 28. Thus the small differences between the pressure in the pipes 6 and 7 are indicated by proportional changes in the pressure shown by the gage 37.

What we claim is:

1. In a differential pressure sensing unit, a hollow casing having relatively thick walls, a diaphragm dividing said casing into two separate closed chambers, means for introducing fluid under relatively high pressure to both chambers, the pressure in one chamber being somewhat less than that in the other, said casing having an opening therein communicating with one of said chambers, a hollow tube sealed at one end portion to the wall of the casing around said opening, the second end of the tube projecting into said last mentioned chamber in operative relation to one surface of said diaphragm, means connecting the second end of the tube to the diaphragm, a rod within said tube and sealed at one of its ends to the second end of the tube, the second end of said rod projecting beyond said tube to the outside of the casing, a pivot supporting said rod at an intermediate point thereof and mechanism actuated by the second end of said rod.

2. In a differential pressure sensing unit, a hollow casing having relatively thick walls, a diaphragm dividing said casing into two separate closed chambers, means for introducing fluid under relatively high pressure to both chambers, the pressure in one chamber being somewhat less than that in the other, said casing having an opening therein communicating with one of said chambers, a hollow tube sealed at one end portion to the wall of the casing around said opening, the second end of the tube projecting into said last mentioned chamber in operative relation to one surface of said diaphragm, means connecting the second end of the tube to the diaphragm, a substantially rigid rod within said tube and sealed at one of its ends to the second end of the tube, said rod having a narrow region of flexibility adjacent its sealed end, the second end of said rod projecting beyond said tube to the outside of the casing, a pivot supporting said rod at an intermediate point thereof and mechanism actuated by the second end of said rod.

3. In a differential pressure sensing unit, a hollow casing having relatively thick walls, a diaphragm dividing said casing into two separate closed chambers, means for introducing fluid under relatively high pressure to both chambers, the pressure in one chamber being slightly less than that in the other, said casing having an opening therein communicating with one of said chambers, a hollow tube sealed at one end portion to the wall of the casing around said opening, the second end of the tube projecting into said last mentioned chamber in operative relation to one surface of said diaphragm, means connecting the second end of the tube to the diaphragm, a substantially rigid rod within said tube and sealed at one of its ends to the second end of the tube, said rod having a hinge-like portion therein adjacent its sealed end, the second end of said rod projecting beyond said tube to the outside of the casing, a pivot supporting said rod at an intermediate point thereof and mechanism actuated by the second end of said rod.

4. In a differential pressure sensing unit, a hollow casing having relatively thick walls, a diaphragm dividing said casing into two separate closed chambers, means for introducing fluid under relatively high pressure to both chambers, the pressure in one chamber being somewhat less than that in the other, said casing having an opening therein communicating with one of said chambers, a hollow tube sealed at one end portion to the wall of the casing around said opening, the second end of the tube projecting into said last mentioned chambers in operative relation to one surface of said diaphragm, a member connecting the second end of the tube to the diaphragm, a substantially rigid rod within said tube and sealed at one of its ends to the second end of the tube, said rod having therein adjacent said last mentioned seal a pair of kerfs from opposite sides of said rod, said kerfs being spaced apart a distance less than the diameter of said rod and extending into the rod in the general direction of said member, the second end of said rod projecting beyond said tube to the outside of the casing, a pivot supporting said rod at an intermediate point thereof and mechanism actuated by the second end of said rod.

KENNETH L. TATE.
FLOYD B. NEWELL.

No references cited.